(12) United States Patent
Tian

(10) Patent No.: US 6,817,785 B2
(45) Date of Patent: Nov. 16, 2004

(54) METHOD AND APPARATUS FOR SPLICING OPTICAL FIBERS

(75) Inventor: Yong Tian, Dammarie-les-Lys (FR)

(73) Assignee: Corning Cable Systems LLC, Hickory, NC (US)

( * ) Notice: Subject to any disclaimer, the term of this patent is extended or adjusted under 35 U.S.C. 154(b) by 135 days.

(21) Appl. No.: 10/136,117

(22) Filed: May 1, 2002

(65) Prior Publication Data
US 2002/0164132 A1 Nov. 7, 2002

(30) Foreign Application Priority Data
May 3, 2001 (EP) .............................................. 01401138

(51) Int. Cl.[7] .............................................. G02B 6/255
(52) U.S. Cl. .............................. 385/96; 385/95; 385/97; 385/98
(58) Field of Search .............................. 385/96, 95, 97, 385/98

(56) References Cited

U.S. PATENT DOCUMENTS

| 6,411,759 B1 | * | 6/2002 | Beguin et al. | 385/49 |
| 6,453,090 B1 | * | 9/2002 | Conde et al. | 385/33 |
| 6,652,163 B2 | * | 11/2003 | Fajardo et al. | 385/96 |
| 6,705,771 B2 | * | 3/2004 | Jiang et al. | 385/96 |
| 2001/0047668 A1 | * | 12/2001 | Ochiai et al. | 65/407 |
| 2003/0059179 A1 | * | 3/2003 | Jiang et al. | 385/96 |

FOREIGN PATENT DOCUMENTS

| EP | 0320978 | 6/1989 | |
| EP | 0404152 | 12/1990 | |
| JP | 57-24906 | 2/1982 | |
| JP | 02281207 A | * 11/1990 | ........... G02B/6/255 |
| WO | WO9953351 | 10/1999 | |

OTHER PUBLICATIONS

Patent Abstracts of Japan, vol. 006, No. 088 (P–118), May 26, 1982 (relates to JP57–24906, listed above).

* cited by examiner

Primary Examiner—Hemang Sanghavi
Assistant Examiner—Sung Pak

(57) ABSTRACT

Good quality fusion splicing of optical fibers with very different melting points (even 800° C. and 1800° C.) can be achieved by heating the end (3) of the fiber of lower melting point to a substantial extent (preferably entirely) by conduction from the pre-heated end (4) of the fiber of higher melting point. Preheating is suitably by a laser with its beam (15) centered close to the interface between the two fibers (or slightly displaced in the direction of the fiber of higher melting point if the intensity of the beam is relatively evenly spread) using a screen (13) to shade the fiber of lower melting point from the beam.

17 Claims, 1 Drawing Sheet

METHOD AND APPARATUS FOR SPLICING OPTICAL FIBERS

CROSS-REFERENCES TO RELATED APPLICATIONS

Not applicable

STATEMENT REGARDING FEDERALLY SPONSORED RESEARCH & DEVELOPMENT

Not applicable

REFERENCE TO A MICROFICH APPENDIX

Not applicable

BACKGROUND OF THE INVENTION

1. Field of the Invention

This invention relates to a method of splicing optical fibers and to apparatus for use in the method. More particularly it is concerned with the splicing by fusion of fibers that differ considerably in melting point.

2. Description of the Related Art Including Information Disclosed Under 37C. F. R. 1.97 and 1.98

Optical fibers of identical or similar melting point are routinely spliced by aligning the fiber ends and bringing the ends together while heating both of them to melting point, usually by means of an electric arc, a flame or a laser (usually a $CO_2$ laser), so as to obtain a fusion bond.

There is an increasing need for splices between fibers with widely different melting points, and these are currently being made with adhesives or mechanical splices, which may be susceptible to ageing and/or damage from environmental conditions, because attempts to use fusion splicing resulted in splices with a degree of distortion at the interface that made their optical properties unsatisfactory.

JP57-24906A and EP0404152A disclose methods in which heating is concentrated at a point displaced from the fiber ends, so that the fiber of higher melting point is heated to a higher temperature than the fiber of lower melting point, but so that both fibers will be heated to their respective melting points. If the fibers are in contact during heating, some degree of heating by conduction of the fiber of lower melting point may be assumed to occur, but this will not be substantial as both fibers are to be heated directly by the arc or other heat source; and there is a risk of serious distortion if the fiber of higher melting point first softens at the place where heating is most intense, not at its end.

BRIEF SUMMARY OF THE INVENTION

The present invention provides a means by which satisfactory fusion splices may be made between fibers with melting points that differ even by many hundreds of degrees.

The method in accordance with the invention comprises aligning the fiber ends and bringing the ends together while heating at least one of them to its melting point so as to obtain a fusion bond and is distinguished by the fact that the fiber of lower melting point is heated to a substantial degree by thermal conduction from the fiber of higher melting point.

It is neither necessary nor desirable to heat to the melting point of the higher-melting fiber.

It is to be expected that a small degree of upsetting of the fiber end of lower melting point will occur, but this can be controlled at a level that is not detrimental to the optical performance of the splice.

The invention includes apparatus for use in the method described comprising clamps for holding the fiber ends, adjusting mechanisms for aligning them, a mechanism for bringing them together and a heat source for heating at least one of them to its melting point while doing so, so as to obtain a fusion bond, and distinguished by the heat source being arranged to heat one of the fibers predominately, so that the other will be heated to a substantial degree by thermal conduction from the first-mentioned fiber.

Preferably the fiber of lower melting point is heated as nearly as possible entirely by conduction from the fiber of higher melting point.

It is unlikely that heat from an arc or flame could be localized to the required extent and so it is very much preferred, and might be almost essential under some circumstances, for the heat source to be a laser. An additional advantage of using laser heating is that the fibers can be clamped closer to their ends than when using arc or flame heating, and so precise alignment of the fibers can be better maintained during and after fusion.

Conventional lasers and control systems can be used, but we prefer to use the high-stability control system that is described in our European patent application EP1136855A (which is incorporated herein in its entirety by reference).

Preferably no part of either fiber is heated to a higher temperature than the end face of the fiber of higher melting point, and since it is impossible or at least difficult to obtain a beam with a sharp cut-off at the edge, this will normally require the use of a screen to establish a steep gradient of radiation intensity from a maximum near the end face of the fiber of higher melting point to near zero at the end face of the fiber of lower melting point (in relation to the initial positions of the fiber ends). If the beam has a sharp intensity maximum, it is preferable that it is centered close to the interface between the two fibers, so that about half the beam (at least to the extent it would fall on the fibers) will be intercepted by the screen; if the intensity of the beam is more evenly distributed, it may be desirable for the center of the beam to be slightly offset in the direction of the fiber of higher melting point.

In either case, because diffraction at the edge of the screen may be appreciable, the edge is preferably offset so that it projects slightly (a few micrometers or a few tens of micrometers is sufficient) beyond the edge of the fiber of lower melting point and preferably the screen is only slightly spaced (say a few tens of micrometers) from the surface of the fiber.

Since the screen should be heated as little as possible, it is preferably made of (or surfaced with) a material that reflects the laser radiation and inclined or shaped so that radiation falling on the screen is not reflected back to its source. It may be possible to arrange the screen so that some of the laser radiation falling on it will be reflected onto the end of the fiber of higher melting point. Stainless steel is a preferred material, but alternatively other refractory metals or tough ceramic materials might be used.

Except as otherwise described, the clamping, aligning, sequencing and movement of the fiber end and the apparatus for effecting them may be substantially the same as in conventional fusion splicers, but we prefer (as more fully explained later) to clamp the stripped fiber ends firmly and therefore to move the clamps holding them when bringing the fiber ends together, rather than clamp only the unstripped fiber ends and slide the stripped ends through loosely-fitting guides.

BRIEF DESCRIPTION OF THE SEVERAL VIEWS OF THE DRAWINGS

The invention will be further described, by way of example, with reference to the accompanying drawings in which.

DETAILED DESCRIPTION OF THE INVENTION

Each of the figures shows the parts of the apparatus in the positions they occupy after alignment but before heating begins.

Figure 1:
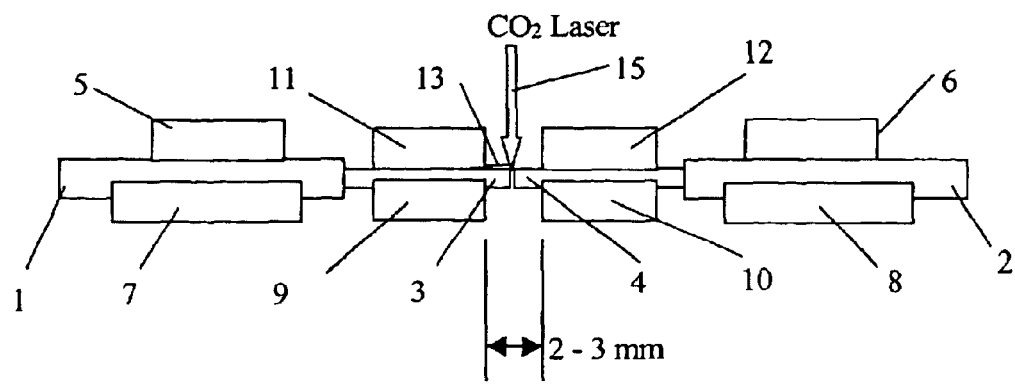
FIG. 1 is a diagrammatic side view of apparatus in accordance with the invention (with fiber ends shown in position)
Figure 2:
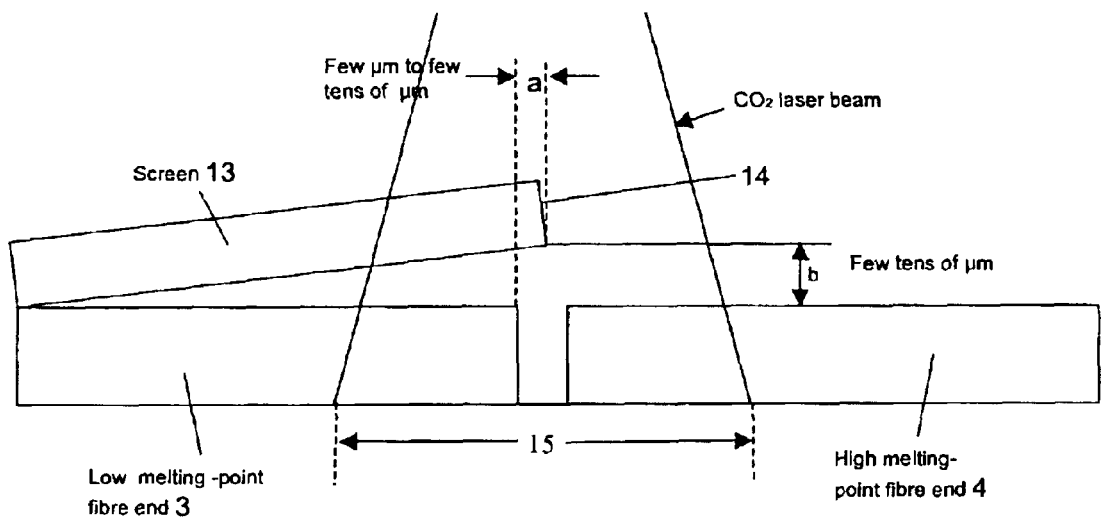
FIG. 2 is an enlarged detail of a key part of the apparatus of FIG. 1.

In making a splice with the apparatus of FIG. 1, the fiber of lower melting point 1 and the fiber of higher melting point 2 are each prepared in the usual way by removing protective coatings from short end parts 3 and 4 respectively and mounted in a conventional manner using fiber holders 5 and 6 and supports 7 and 8. The exposed fiber ends are precisely located using V-groove blocks 9 and 10 and clamps 11 and 12, and these can be placed as close as 1.5 mm to the ends of the fibers (compared with about 3 mm when using an arc as heat source) and clamped firmly. A screen 13 is positioned as shown in FIG. 2, preferably using a micromanipulator independent of the several fiber supports. The usual active alignment techniques and microscopic observation with an optical instrument or a video camera are now used to bring the two fiber ends into alignment with the required precision, at this stage with the fiber ends remaining a few tens of micrometers apart. The screen 13, a plain strip of stainless steel, is located with its working end 14 projecting slightly (by distance a, for example a few micrometers or a few tens of micrometers) beyond the end of the fiber of lower melting point and spaced slightly (by distance b, for example a few tens of micrometers) from the surface of that fiber, and at an inclination of about 1.5° to the axis of the fibers, so that on projecting the beam 15 of a $CO_2$ laser onto the junction of the fibers, the fiber of lower melting point will be fully in shadow and laser radiation falling on the screen will be deflected away from the laser.

Once all the elements are in position, the laser is activated to heat the end of fiber 2 and the supports, including the V-groove blocks 9 and 10 and their clamps 11 and 12, are advanced to bring the fiber ends into contact; then, as the end of fiber 1 melts, they are advanced a few micrometers further so as to produce a slight upsetting of the end of fiber 1. After a short cooling period, the completed splice can be released from the clamps and protected in the usual way.

Figure 3:
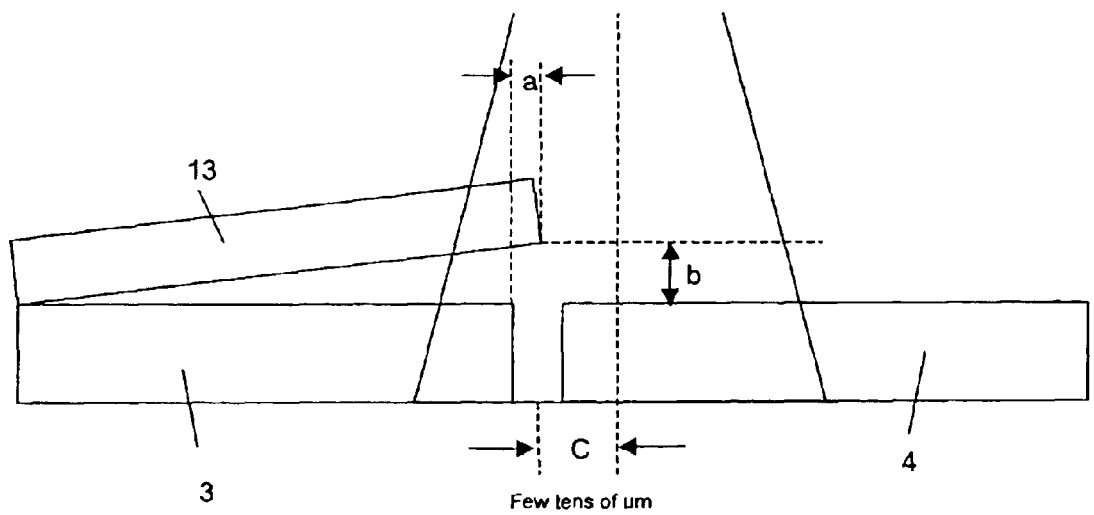
FIG. 3 is a view, corresponding to FIG. 2, showing an alternative form of apparatus in accordance with the invention.

FIG. 1 assumes that the laser beam has a sharp intensity maximum at its center. If a beam with a relatively flat intensity distribution is used, it may be desirable as shown in FIG. 3, to displace the center of the beam a short distance (distance c, for example a few tens of micrometers) in the direction of the fiber of higher melting point, so that less radiation falls on the screen 13. The displacement c should not be so great that the temperature (after heating) of the end-face of the fiber of higher melting point is lower than the temperature of an adjacent part of the fiber, and it may be desirable for the beam to have a cross-section that is elongated in the direction of the length of the fibers.

A prototype apparatus in accordance with FIGS. 1 and 2 was used to splice a fiber with a melting point of about 800° C. to a silica-based fiber (CS980 grade) with a melting point of about 1800° C. The fiber ends were initially positioned 50 $\mu$m apart and the end of the silica-based fiber was heated with a beam power of 4.4 watts for 0.5 second before the fiber ends were brought together; heating continued at the same power for a further 0.6 second and as the end of the multi-component fiber melted the clamps were advanced a further 6 $\mu$m, resulting in a perceptible upset adjacent the interface. A total of 14 splices were made in this way and losses of only about 0.44±0.13 dB at 1310 nm were obtained.

What is claimed is:

1. A method of splicing optical fibers that differ substantially in melting point comprising aligning ends of the fibers and bringing said ends together while directing energy from a heat source only onto the end of the fiber of higher melting point wherein the fiber of lower melting point is heated to its melting point predominantly by thermal conduction from the fiber of higher melting point, so as to obtain a fusion bond.

2. A method as claimed in claim 1 in which a small and controlled degree of upsetting of the end of the fiber of lower melting point occurs.

3. A method as claimed in claim 1 wherein said fiber of lower melting point is heated substantially entirely by conduction from said fiber of higher melting point.

4. A method as claimed in claim 1 wherein said heat source is a laser.

5. A method as claimed in claim 4 further comprising using a screen to establish a steep gradient of laser radiation intensity from a maximum near the end face of said fiber of higher melting point to near zero at the end face of said fiber of lower melting point, in relation to the initial positions of the fiber ends.

6. A method as claimed in claim 5 wherein the laser produces a beam having a sharp radiation intensity maximum centered close to the interface between the two said fibers.

7. A method as claimed in claim 5 wherein the laser produces a beam having an evenly distributed radiation intensity and the center of the beam is slightly offset from the interface between the two fibers in the direction of the fiber of higher melting point.

8. Apparatus for splicing optical fibers that differ substantially in melting point comprising clamps for holding two fiber ends, adjusting mechanisms for aligning them, a mechanism for bringing them together and a heat source wherein the heat source is arranged to heat the fiber of the higher melting point predominantly, so that the other fiber will be heated to its melting point predominantly by thermal conduction from the fiber of the higher melting point, so as to obtain a fusion bond.

9. Apparatus as claimed in claim 8 wherein said heat source is arranged to heat only the fiber of higher melting point.

10. Apparatus as claimed claim 8 wherein said heat source is a laser.

11. Apparatus as claimed in claim 10 further comprising a screen positioned to establish a steep gradient of laser radiation intensity from a maximum near the end face of the fiber of higher melting point to near zero at the end face of the fiber of lower melting point, in relation to the initial positions of the fiber ends.

12. Apparatus as claimed in claim 11 wherein said laser produces a beam having a sharp radiation intensity maximum which is centered close to the interface between the two fibers.

13. Apparatus as claimed in claim 11 wherein said laser produces a beam having evenly distributed radiation intensity the center of which is slightly offset from the interface between the two said fibers in the direction of said fiber of higher melting point.

14. Apparatus as claimed in claim 11 wherein the edge of said screen projects slightly beyond the edge of said fiber of lower melting point.

15. Apparatus as claimed in claim 11 wherein said screen is only slightly spaced from the surface of said fiber of lower melting point.

16. Apparatus as claimed in claim 11 wherein said screen is at least surfaced with a material that reflects the laser radiation and inclined or shaped so that radiation falling on the screen is not reflected back to its source.

17. Apparatus as claimed in claim 11 wherein said screen is made of stainless steel.

* * * * *